United States Patent
Wang

(10) Patent No.: US 10,922,696 B2
(45) Date of Patent: Feb. 16, 2021

(54) SMART AGENT SERVICES USING MACHINE LEARNING TECHNOLOGY

(71) Applicant: SAP SE, Walldorf (DE)

(72) Inventor: Chongyao Wang, Shanghai (CN)

(73) Assignee: SAP SE, Walldorf (DE)

( * ) Notice: Subject to any disclaimer, the term of this patent is extended or adjusted under 35 U.S.C. 154(b) by 188 days.

(21) Appl. No.: 15/812,205

(22) Filed: Nov. 14, 2017

(65) Prior Publication Data

US 2019/0147455 A1 May 16, 2019

(51) Int. Cl.
| | |
|---|---|
| G06F 16/248 | (2019.01) |
| G06F 16/2457 | (2019.01) |
| G06Q 30/00 | (2012.01) |
| G06N 20/00 | (2019.01) |
| G06F 16/242 | (2019.01) |
| G06Q 10/10 | (2012.01) |

(52) U.S. Cl.
CPC ......... *G06Q 30/016* (2013.01); *G06F 16/243* (2019.01); *G06F 16/248* (2019.01); *G06F 16/24578* (2019.01); *G06N 20/00* (2019.01); *G06Q 10/10* (2013.01)

(58) Field of Classification Search
CPC ............. G06F 16/3329; G06F 17/2705; G06F 16/9535; G06F 40/30; G06F 16/24578; G06F 16/903; G06F 16/338; G06F 16/243; G06F 16/248; G06N 20/10; G06N 20/00; G06N 3/0427; G06N 5/022; G06Q 30/016

See application file for complete search history.

(56) References Cited

U.S. PATENT DOCUMENTS

| | | | | |
|---|---|---|---|---|
| 6,760,722 | B1 * | 7/2004 | Raghunandan | G06N 5/046 |
| 8,429,103 | B1 * | 4/2013 | Aradhye | G06N 20/00 |
| | | | | 706/12 |
| 10,410,219 | B1 * | 9/2019 | El-Nakib | G06F 16/90332 |
| 2009/0320035 | A1 * | 12/2009 | Ahlgren | G06F 9/468 |
| | | | | 718/104 |
| 2010/0274618 | A1 * | 10/2010 | Byrd | G06Q 10/10 |
| | | | | 704/275 |
| 2011/0093271 | A1 * | 4/2011 | Bernard | G06F 40/30 |
| | | | | 704/257 |
| 2014/0280253 | A1 * | 9/2014 | Clark | G06F 16/3344 |
| | | | | 707/755 |
| 2015/0032443 | A1 * | 1/2015 | Karov | G06F 17/2785 |
| | | | | 704/9 |

(Continued)

*Primary Examiner* — Cheyne D Ly
(74) *Attorney, Agent, or Firm* — Schwegman Lundberg & Woessner, P.A.

(57) ABSTRACT

Systems and methods are provided for training a machine learning model using a plurality of data related to a product and services support system to determine a plurality of parameters to be used to search for one or more results for an input stream and storing the plurality of parameters in one or more databases. Systems and methods further provide for receiving an input stream from a user computing device, parsing the input stream to generate a parsed input stream, translating the parsed input stream into one or more of the plurality of parameters output from the machine learning model to generate a search string, searching a knowledge base using the search string to determine one or more results associated with the parsed input stream, and providing at least one result of the one or more results associated with the parsed input stream to the user computing device.

17 Claims, 8 Drawing Sheets

(56) References Cited

U.S. PATENT DOCUMENTS

| | | | |
|---|---|---|---|
| 2015/0066479 A1* | 3/2015 | Pasupalak | G06F 40/40 704/9 |
| 2015/0379072 A1* | 12/2015 | Dirac | G06N 20/00 707/693 |
| 2017/0199943 A1* | 7/2017 | Steelberg | G06F 16/9032 |
| 2019/0149489 A1* | 5/2019 | Akbulut | H04L 12/1822 709/206 |

* cited by examiner

402

```
Message Number : 0120050409 0000072224 2004        Installation  : 0020143752
Short Text:       FBWE wth ES02/CSB58 does not generate a DME file and dumps
Contact Person:   Mr. J Engberink                   Country       : GB
Phone Number:     004431416689750                   R/3 Release:    620
Customer Name:    Fujifilm Diosynth Biotechnologies U Database    : ORACLE 9.2
Customer Number:  11873                             Oper. System  : NT/INTEL
Product:          SAP R/3 ENTERPRISE                Product Vers.:  47X110
```

Description
Transaction:FBWE    Program:SAPMFBWE    Screen:214
Error Message: LOAD_PROGRAM_NOT_FOUND When I create a BoE debtors payment with F110 and subsequently want to
present it with FBWE to the bank and generate a DME file with CSB58, a
popup screen appears which request a payment method. However program FBWE
should recognize the payment method already used in program F110. If I
then skip this pop up screen the program dumps with LOAD_PROGRAM_NOT_
FOUND. I have already implemented note 526145, but this didn't solve
the problem. If I use in FBWE the DME type CSB32, the program works fine.

404

```
Message Number : 0120050409 0000089244 1999        Installation  : 0820023952
Short Text:       Reason Code Correspondence doesnt work in LockboxPostProce
Contact Person:   Mr. RIENTS RICHARD                Country       : US
Phone Number:     001992370S                        R/3 Release:    40B
Customer Name:    E.I. du Pont de Nemours and Company Database    : DB2/CS
Customer Number:  22481                             Oper. System  : AIX
Product:                                            Product Vers.:
```

Description
Transaction   FB05      Program   SAPMF05A      Screen
When executing lockbox post processing, we enter a reason code to clear
payment descrepancies. These Reason Codes are linked to automatic
correspondence. The system does not issues the correspondence request.

Need example

Home  Topics  Products  About   *Search...*

Cameras > Topics > DSLR > Digital Camera has issue

[?] Question

Digital Camera has issue

By A. Wang  • a few seconds ago   DSLR

602

My Digital camera has error message: 4278.

Reply • Unfollow   👍 0   💬 1   ⊕ 1

*Write a reply...*

1 Answer                                Sorted by: Newest ▽

604

EW  • a few seconds ago

This error message means that the card is corrupted or formatted for another digital camera. Turn off the camera. Insert a new card or format the card. CAUTION: Formatting deletes all pictures and videos, including those that are protected. Removing a card during formatting may damage the card.

Reply

*FIG. 6*

SMART AGENT SERVICES USING MACHINE LEARNING TECHNOLOGY

BACKGROUND

A support service process typically comprises a user calling a call center to talk to a support agent or a user utilizing an online chat service to chat to the support agent. The support agent may have access to a knowledge base to try to find answers to the issues the user is calling or chatting about. The infrastructure, labor, and knowledge costs of these typical support processes are very high and customer satisfaction of such processes are often low due to the waiting time, interaction, and quality of answers. Moreover, there are many technical challenges to providing support service, particularly in a cloud or network business, such as eCommerce, which has a very high volume of user inquiries.

BRIEF DESCRIPTION OF THE DRAWINGS

Various ones of the appended drawings merely illustrate example embodiments of the present disclosure and should not be considered as limiting its scope.

FIG. 4 illustrates example support tickets, according to some example embodiments.

FIG. 6 illustrates an example user interface, according to some example embodiments.

DETAILED DESCRIPTION

Systems and methods described herein provide for a smart support service agent utilizing natural language processing (NLP) and machine learning algorithms. For example, a machine learning model is trained using data related to a product and services support system to determine parameters to be used to search for one or more answers to an inquiry input by a user (e.g., about a product or service). The parameters output by the machine learning model are stored in one or more databases to be used to search for answers to an inquiry. When the computing system receives an inquiry from a user, the computing system parses the inquiry (e.g., using NLP) to generate a parsed input stream and translates the parsed input stream into one or more of the plurality of parameters output from the machine learning model to generate a search string. The computing system searches a knowledge base using the search string to determine one or more results associated with the parsed input stream. The computing system can then use the results to provide an answer in response to the user input.

The computing system may also determine a score for the answer provided in response to the user input, based on a user interaction in response to the answer (e.g., indicating the user is satisfied or unsatisfied with the answer, the popularity of the answer, etc.) and associate the score with the answer and store the score in the knowledge base with the answer. This score may be used to select a result, from a plurality of results, as the best result to provide as an answer to an inquiry.

Example embodiments described herein provide for a number of technical benefits. For example, one challenge of a conventional call support system where a user calls in to talk to a support agent or chats with a support agent online is the pure volume of user inquiries. It is often not possible to have enough support agents to support such a volume. Example embodiments allow for a computing system to manage and respond to user inquiries, regardless of the volume. This results in a faster system for responding to inquiries and a more efficient system.

Another challenge in conventional call support systems is that it is not possible for a support agent to actually search through tens of thousands or more pieces of data to provide the best answer to a user inquiry. Typically a support agent may only be able to access a small subset of data and have very limited information with which to respond. Example embodiments allow for a computing system to access all of the data in a knowledge base, as well as third party and public data, to provide a response to a user inquiry. This is just not possible in conventional call support systems. This allows for much more accurate results and a more efficient system since the more accurate the results, the less inquiries and communication between a user device and a computing system are needed.

Figure 1:
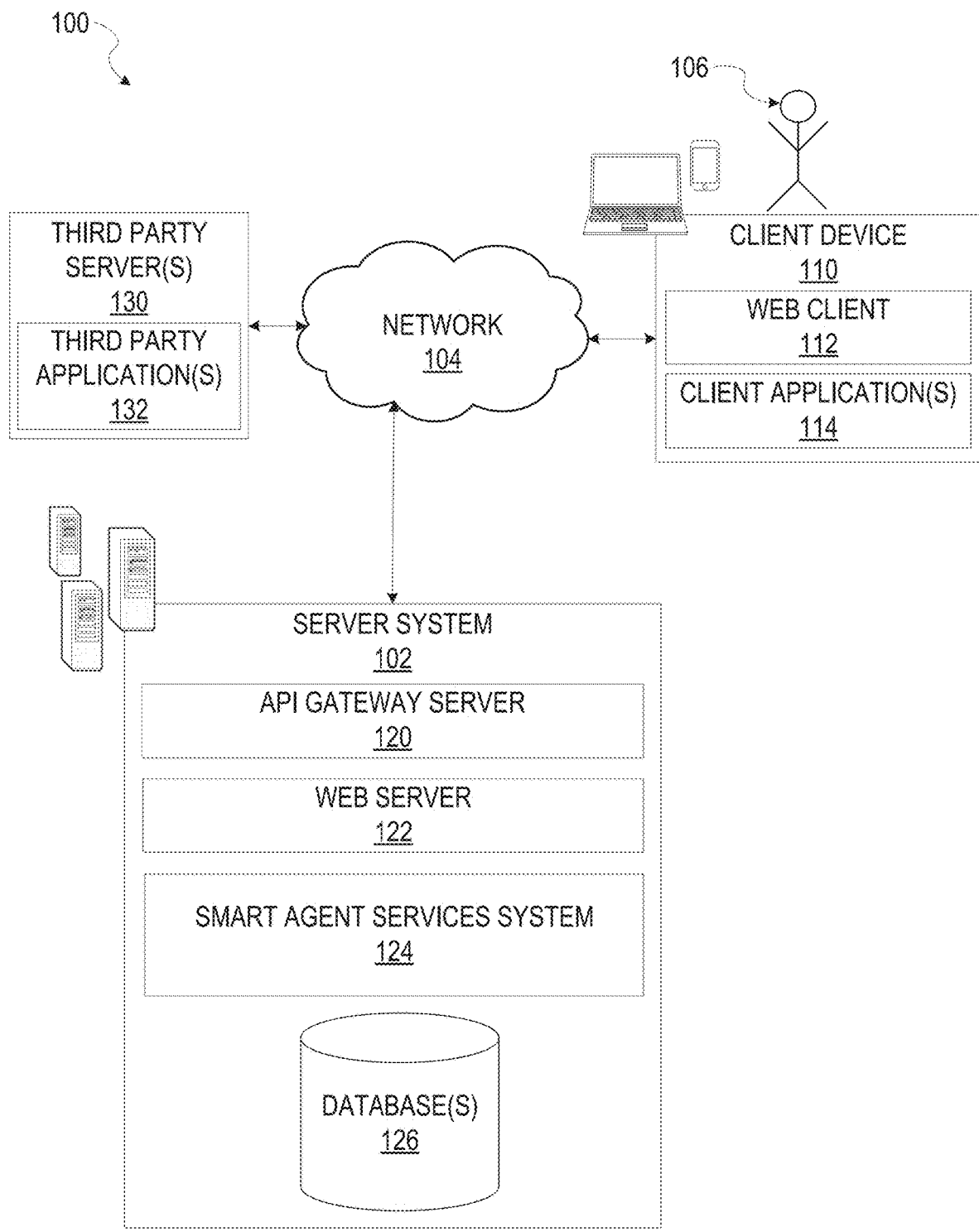
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive information via a digital assistant or smart agent service, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alphanumeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a digital assistant application, a smart agent service application, a customer support application, and the like.

In some embodiments, one or more client applications 114 may be included in a given one of the client device 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access enterprise resource planning (ERP) or customer relationship management (CRM) data, to request data, to authenticate a user 106, to verify a method of payment, interact with smart agent services, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) gateway server 120, a web server 122, and smart agent services system 124, that may be communicatively coupled with one or more databases 126 or other form of data stores.

The one or more databases 126 may be one or more storage devices that store data related to an enterprise system, user data, and other data. The one or more databases 126 may further store information related to third party servers 130, third party applications 132, client devices 110, client applications 114, users 106, and so forth. The one or more databases 126 may include cloud-based storage in some embodiments. The one or more databases 126 may comprise data related to various product and services, support services data, and so forth.

The server system 102 may be a cloud computing environment, according to some example embodiments. The server system 102, and any servers associated with the server system 102, may be associated with a cloud-based application, in one example embodiment.

The smart agent services system 124 may manage resources and provide back-end support for third party servers 130, third party applications 132, client applications 114, and so forth, which may include cloud-based applications. The smart agent services system 124 may provide functionality for support services related to products and services, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more of the third party applications 132 may request and utilize information from the server system 102 via the API server 120 to support one or more features or functions on a website hosted by the third party or an application hosted by the third party. The third party website or application 132, for example, may provide various functionality that is supported by relevant functionality and data in the server system 102.

Figure 2:
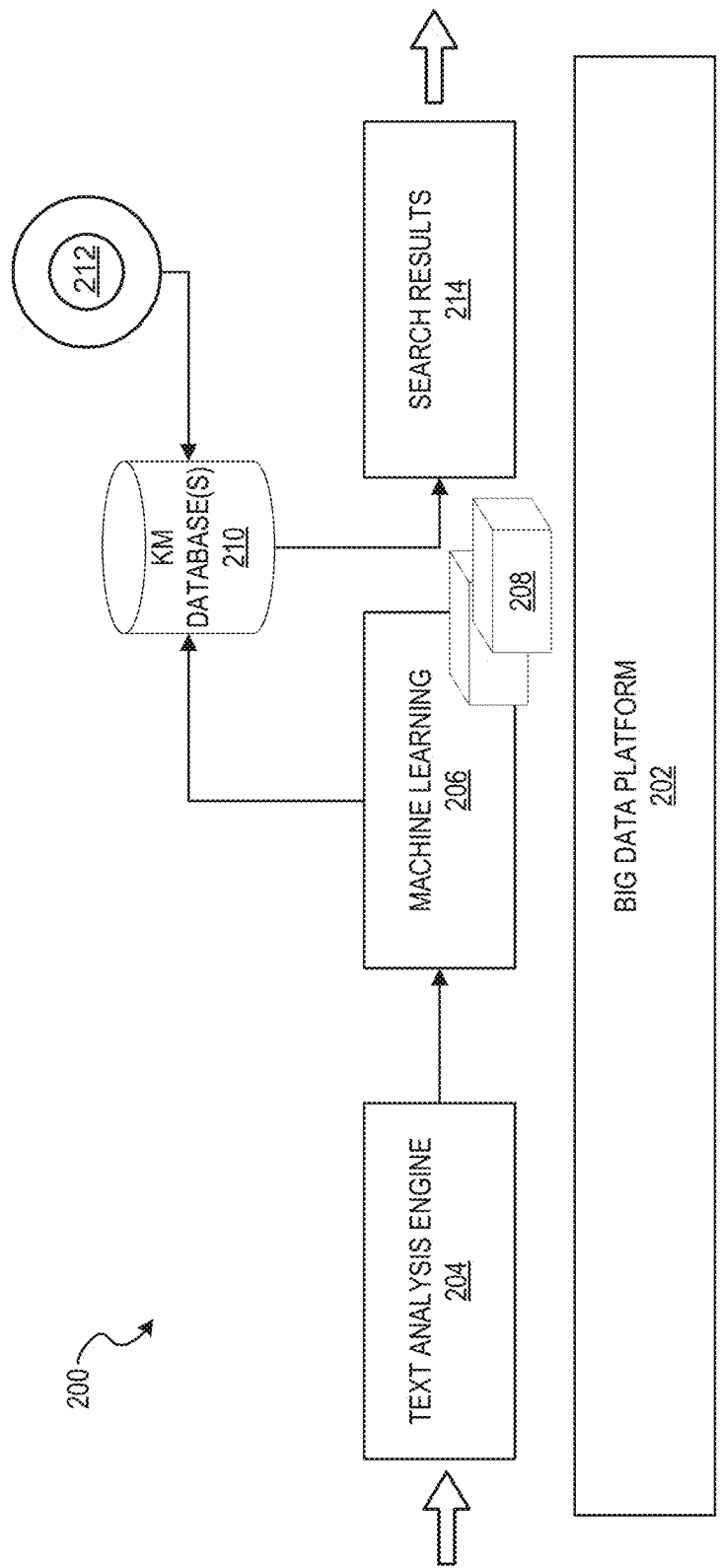
FIG. 2 is a diagram illustrating an example architecture, according to some example embodiments.

FIG. 2 is a block diagram showing an example architecture 200 for the smart agent services system 124. The example architecture 200 may be associated with a big data platform 202. A text analysis engine 204 may comprise functionality for tokenization and natural language processing (NLP). A machine learning module 206 may comprise functionality for training one or more machine learning models (e.g., via deep learning machines 208) with a plurality of data related to a support system or other data associated with the smart agent service system 124. For example, the machine learning module may input the plurality of data into a machine learning model and run the machine learning model on the training dataset. The machine learning module 206 may comprise functionality to determine a plurality of parameters output from the one or more machine learning models to be used to search for one or more results of an input stream (e.g., an input from a user computing device such as client device 110), store such parameters, and further manipulate or update such parameters. The machine learning module 206 may further comprise functionality to receive a parsed input stream from the text analysis engine 204 and translate the parsed input stream into one or more parameters output from the machine learning to generate a search string. The machine learning module 206 may use the search string to search for results in one or more knowledge management database(s) 210.

One or more machine learning models may be used in various example embodiments described herein. Some examples of machine learning models include recursive neural networks (RNN), Gated Feedback Recurrent Neural Networks (GRUs), Long Short-Term Memory (LSTMs), and so forth.

The knowledge management database 210 (e.g., which could be part of the one or more databases 126, or a separate database or data store), comprises a plurality of data, such as product documentation, services documentation, customer questions (e.g., actual previously asked questions by customers), frequently asked questions (FAQs), anticipated questions, questions posted to community web sites or the internet in general, answers to customer questions, internet samples, customer support tickets, and so forth. A search results module 214 may receive the results of a search of the knowledge management database 210 and provide the results to one or more user computing device devices (e.g., client device 110) or other systems (e.g., third party servers 130, third party applications 132, etc.).

A re-indexing module 212 may comprise functionality for determining a score for one or more results provided to a user device, based on user interaction associated with the result. The re-indexing module 212 may associate the score with the result and store the score in the knowledge management database 210. The re-indexing module 212 may also rank or index the results based on the associated scores for faster and/or more efficient retrieval.

Figure 3:
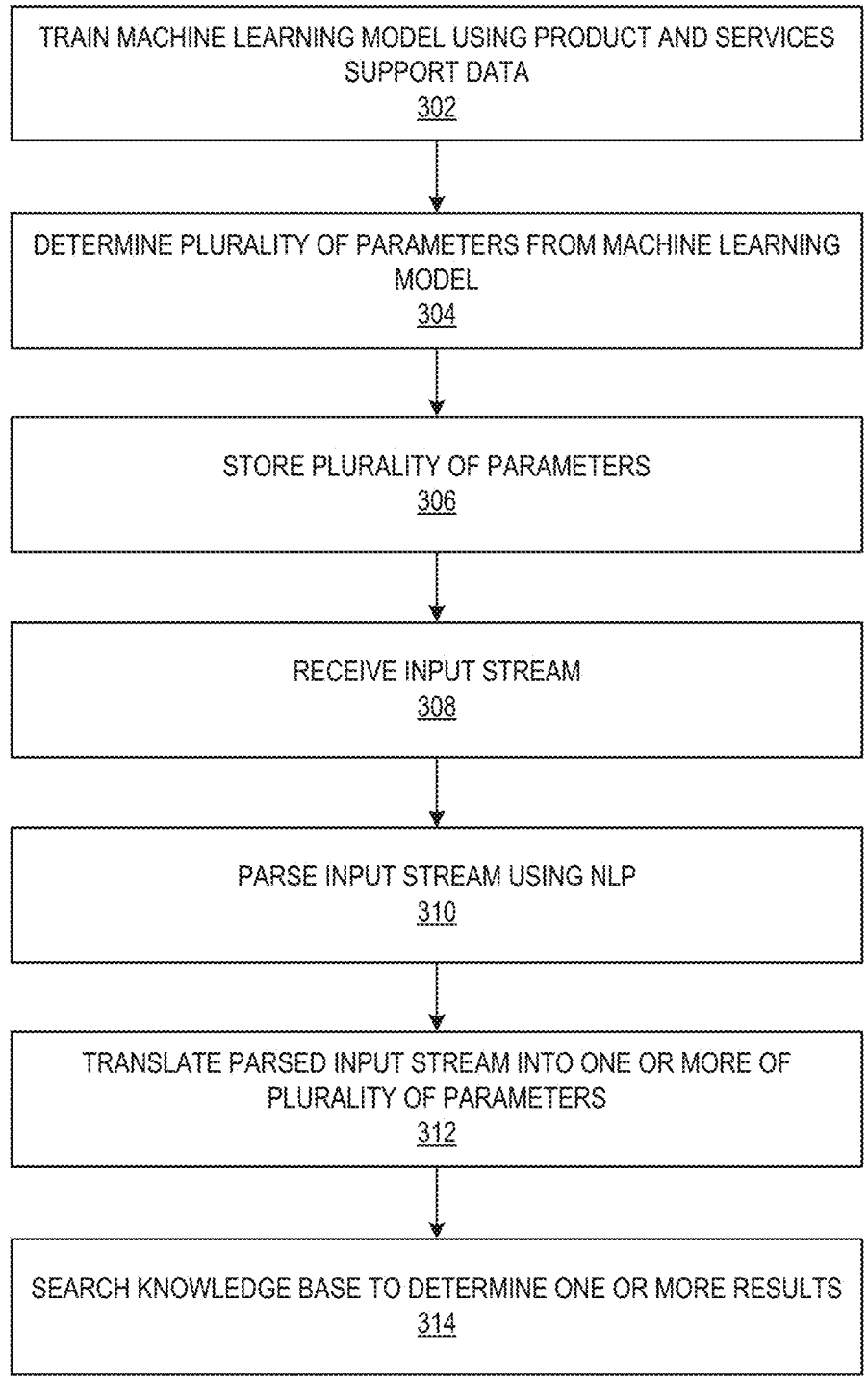
FIG. 3 is a flow chart illustrating aspects of a method, according to some example embodiments.

FIG. 3 is a flow chart illustrating aspects of a method 300, according to some example embodiments. For illustrative purposes, method 300 is described with respect to the networked system 100 of FIG. 1 and FIG. 2. It is to be understood that method 300 may be practiced with other system configurations in other embodiments.

In operation 302, a computing system (e.g., server system 102 or smart agent services system 124) trains a machine learning model using a plurality of data related to a product and services support system to determine a plurality of parameters to be used to search for one or more results from an input stream. For example, training data comprising data related to a product and services support system (e.g., support tickets comprising product information, user issues or questions, responses or results of the issues or questions, etc.), is provided to a machine learning algorithm (e.g., Recursive Neural Network (RNN) or other algorithm). FIG. 4 shows examples of support tickets 402 and 404 comprising a variety of information that may be used as training data. The machine learning algorithm determines patterns in the training data to determine parameters to be used to search for one or more results for an input stream (e.g., to search for results or answers to questions and issues from a user input via a user computing device). The output from machine learning algorithm is a machine learning model that identifies the plurality of parameters to be used to search for one or more results from an input stream. Some example parameters may be a product name, a product number, a subject (e.g., billing, error, pricing, etc.), a product version number, a geographical region, a language, key words, issued time, and the like.

Some sample code for training data, such as the training data shown in FIG. 4, may comprise:

```
<<read customer tickets>>
# prepare the dataset of input to output pairs encoded as integers
seq_length = 100
dataX = [ ]
dataY = [ ]
for i in range(0, n_chars - seq_length, 1):
    seq_in = raw_text [i:i + seq_length]
    seq_out = raw_text [i + seq_length]
    dataX.append( [char_to_int[char] for char in seq_in] )
    dataY.append(char_to_int[seq_out] )
n_patterns = len(dataX)
print ("Total Patterns: ", n_patterns)
# reshape X to be [samples, time steps, features]
X = numpy.reshape(dataX, (n_patterns, seq_length, 1) )
#normalize
X = X / float(n_vocab)
# one hot encode the output variable
Y = np_utils.to_categorical(dataY)
# define the LSTM model
model = Sequential ( )
model.add(LSTM(256, input_shape=(X.shape[1], X.shape[2] ) ) )
model.add(Dropout (0.2) )
model.add(Dense(y.shape[1], activation='softmax') )
model.compile(loss='categorical_crossentropy', optimizer='adam' )
model.fit(X, y, epochs=1, batch_size=128, callbacks=callbacks_list)
int_to_char = dict( ( i, c) for i, c in enumerate (chars) )
# pick a random seed
import sys
start = numpy.random.randint(0, len(dataX) - 1)
pattern = dataX[start]
print ("Seed:")
print ("\"", ' '.join( [int_to_char[value] for value in pattern]), "\"")
# generate characters
For i in range (1000):
    X = numpy.reshape(pattern, (1, len(pattern), 1) )
    X = X / float(n_vocab)
```

```
prediction = model.predict(x, verbose=0)
    index = numpy.argmax(prediction)
    result = in_to_char[index]
    seq_in = [int_to_char[value] for value in pattern]
    pattern.append(index)
    pattern = pattern[1:len(pattern) ]
print ("\nDone.")
```

In operation 304, the computing system determines the plurality of parameters output from the machine learning model to be used to search for one or more results for an input stream and, in operation 306, the computing device stores the plurality of parameters output from the machine learning model in one or more databases (e.g., database(s) 126). In one example, the plurality of parameters output from the machine learning model may be stored in a support source system, such as a database, support knowledge base, service support communicates, and the like.

Figure 5:
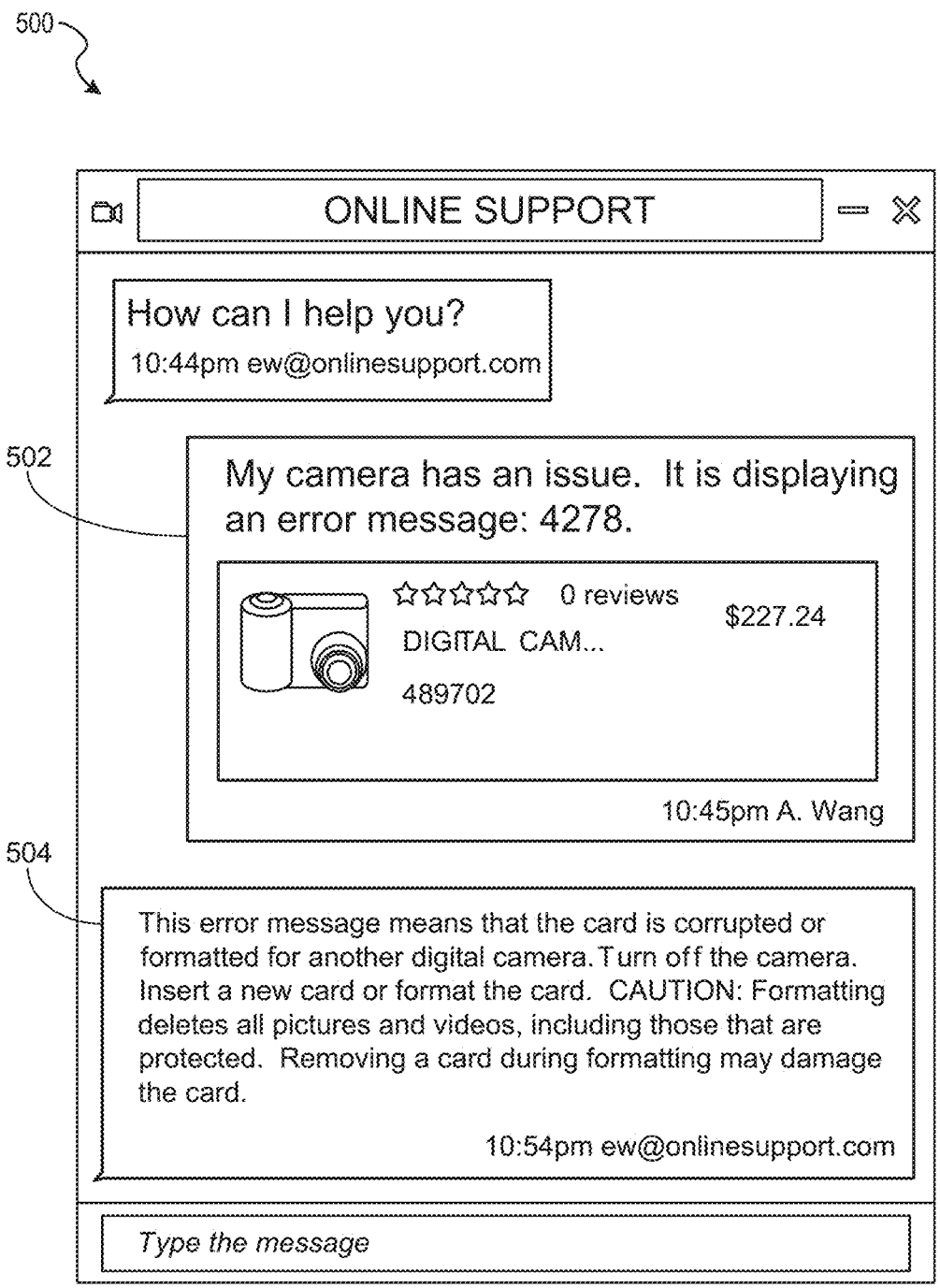
FIG. 5 illustrates an example user interface, according to some example embodiments.

In operation 308, the computing system receives an input stream from a user computing device. For example, a user may input, via text or voice, a question about a product or service he is using. FIG. 5 shows an example online support interface 500 where a user may input a question or issue about a product or service in the interface 500 on his user computing device. In this example, the user input 502 includes information about an issue that he is having with his camera. The user input 502 is received as an input stream from the user computing device and may include the information the user has input 502 and any further information related to the product that may be automatically included with the user input 502. For example, the user computing device sends the input stream from the user computing device to the computing system.

In operation 310, the computing system parses the input stream using NLP to generate a parsed stream. For example, the computing system may use one or more NLP algorithms to parse the input stream and generate a parsed stream.

In operation 312, the computing system translates the parsed input stream into one or more of the plurality of parameters output from the machine learning model to generate a search string. For example, a parsed input stream, such as "How|can I|configure|pricing|engine|in|CRM|system" may be translated into parameters such as CRM/Billing/Version/region. In one example, the computing system may determine an intent of the input (e.g., a subject of the question) and use the intent to determine parameters for the intent. The parsed input stream can then be mapped to the parameters.

In operation 314, the computing system searches a knowledge base using the search string to determine one or more results associated with parsed input stream. The knowledge base may comprise various data related to products and services. For example, the knowledge base may comprise product documentation, services documentation, service support ticket information, product reviews (e.g., user generated content), services reviews (e.g., user generated content), FAQs, and so forth. The computing system may also search other third party sources or public sources to determine one or more results and add any results found to the knowledge base.

In one example, data in the knowledge base may be structured to optimize search results (e.g., to result in more efficient and faster searches). For example, search results (e.g., answers) may be associated with ranking scores and ranked by a ranching mechanism that considers whether the search result was previously ranked as a good or best answer by an issuer or user or author, salinification scores to previous answers from users, votes for answers, likes for answers, based on the fact that no more questions were asked by the user in response to an answer, and so forth. A search result may have a set of scores (e.g., 8, 5, 3, 2, 1) for each behavior (e.g., previously ranked score, etc.) and the scores may be aggregated based on behaviors from users or authors to be indexed accordingly. Whenever scores are changed, a search index may be re-indexed.

The computing system may select at least one of the results to provide to the user computing device. In one example, the computing system may select at least one of the results based on a score or ranking of results, as explained below.

The computing device may provide the at least one result of the one or more results associated with the parsed input stream to the user computing device. The result may be displayed on a user interface of the user computing device, as shown in the example in FIG. 5. In FIG. 5, the result 504 is displayed to the user in the user interface 500. FIG. 6 shows another example of a user input 602 that was asked in an online community and a result 604 provided by the computing system in the user interface 600.

The computing system may determine a score for the at least one result provided to the user computing device, based on a user interaction via the user computing device in response to the at least one result provided to the user computing device. For example, the user may indicate that he is satisfied with the answer. For example, the user may respond with "thank you," "that is helpful," "that answers my question," or the like. In another example, an icon or other method may be provided in the user interface to allow a user to select whether or not he is satisfied with the answer (e.g., a thumbs up or thumbs down or other means). In yet another example, a user may indicate that he is not satisfied with the answer by asking more questions, responding that his question is not answered, or the like. The computing system may also determine the score for the at least one result based on how popular the result is in answering similar questions previously answered. The computing system may also determine the score for the at least one result based on how frequently the result appears from various sources within the knowledge base, in third party sources, in public data, and so forth. For example, a particular result may appear in a customer support ticket, an online community product website, and a blog. In this example, the particular result may be scored higher.

In one example, the score may be between 1 and 100. The score may be determined based on one or more criteria such as the examples above. For example, there may be seven possible results or answers to the input stream, and the scores for one through seven results may be 50, 10, 87, 65, 82, 80, 50. The results may be raked based on the score associated with how useful the result is to respond to an input stream (e.g., 87, 82, 80, 65, 50, 50, 10).

The computing system may associate the score with the result and store the score with the result in the knowledge base. The score may be regularly updated as the computing system accesses and provides the various results to user computing devices.

The score may then be used by the computing system for future inquiries from a user computing device. For example, the computing system may receive a second input stream from a second user computing device; parse the second input stream using NLP to generate a second parsed input stream; translate the second parsed input stream into one or more of the plurality of parameters output from the machine learning model to generate a second search string; search the knowledge base using the second search string to determine a plurality of results associated with the parsed input stream, wherein each of the plurality of results is associated with a score; select at least one result of the plurality of results based on the score associated with the at least one result; and provide the selected at least one result to the user computing device.

The following examples describe various embodiments of methods, machine-readable media, and systems (e.g., machines, devices, or other apparatus) discussed herein.

Example 1

A method comprising:
training, by a computing system, a machine learning model using a plurality of data related to a product and services support system to determine a plurality of parameters to be used to search for one or more results for an input stream;
determining, by the computing system, the plurality of parameters output from the machine learning model to be used to search for one or more results for an input stream;
storing, by the computing system, the plurality of parameters output from the machine learning model in one or more databases;
receiving, by the computing system, an input stream from a user computing device;
parsing, by the computing system, the input stream using natural language processing to generate a parsed input stream;
translating, by the computing system, the parsed input stream into one or more of the plurality of parameters output from the machine learning model to generate a search string;
searching, by the computing system, a knowledge base using the search string, to determine one or more results associated with the parsed input stream; and
providing, by the computing system, at least one result of the one or more results associated with the parsed input stream to the user computing device.

Example 2

A method according to Example 1, further comprising:
determining, by the computing device, a score for the at least one result provided to the user computing device based on a user interaction via the user computing device in response to the at least one result provided to the user computing device; and
associating the score with the at least one result and storing the score in the knowledge base.

Example 3

A method according to any of the previous examples, further comprising:
receiving a second input stream from a second user computing device;
parsing the second input stream using natural language processing to generate a second parsed input stream;
translating the second parsed input stream into one or more of the plurality of parameters output from the machine learning model to generate a second search string;

searching a knowledge base using the second search string to determine a plurality of results associated with the parsed input stream, wherein each of the plurality of results is associated with a score;

selecting at least one result of the plurality of results based on the score associated with the at least one result; and providing the selected at least one result to the user computing device.

Example 4

A method according to any of the previous examples, further comprising:

determining a score for the selected one result based on a user interaction via the user computing device with the computing system; and associating the score with the selected one result and storing the score in the knowledge base.

Example 5

A method according to any of the previous examples, wherein providing at least one result of the one or more results associated with the parsed input stream to the user computing device comprises selecting at least one result of the one or more results associated with the parsed input stream based on a ranking of the one or more results.

Example 6

A method according to any of the previous examples, wherein the one or more results are ranked based on a score associated with how useful the result is for responding to an input stream.

Example 7

A method according to any of the previous examples, wherein the computing system determines a score for the at least one result based on a user interaction via the user computing device in response to the at least one result provided to the user computing device, by detecting at least one of a group comprising: that there are no further inquiries input via the computing device after the at least one result is provided, based on further inquiries input after the at least one result is provided, by detecting an indication from the user computing device that the at least one result is satisfactory to a user associated with the user computing device, and determining that the result is a popular result.

Example 8

A method according to any of the previous examples, wherein the data related to the product and services support systems includes at least one of a group comprising: product documentation, services documentation, support ticket information, product reviews, services reviews, and frequently asked questions and answers.

Example 9

A computing system comprising:
at least one processor; and
a computer-readable medium coupled with the at least one processor, the computer-readable medium comprising instructions stored thereon that are executable by the at least one processor to cause the computing system to perform operations comprising:

training a machine learning model using a plurality of data related to a product and services support system to determine a plurality of parameters to be used to search for one or more results for an input stream;

determining the plurality of parameters output from the machine learning model to be used to search for one or more results for an input stream;

storing the plurality of parameters output from the machine learning model in one or more databases;

receiving an input stream from a user computing device;

parsing the input stream using natural language processing to generate a parsed input stream;

translating the parsed input stream into one or more of the plurality of parameters output from the machine learning model to generate a search string;

searching a knowledge base using the search string, to determine one or more results associated with the parsed input stream; and providing at least one result of the one or more results associated with the parsed input stream to the user computing device.

Example 10

A computing system according to any of the previous examples, the operations further comprising:

determining a score for the at least one result provided to the user computing device based on a user interaction via the user computing device in response to the at least one result provided to the user computing device; and associating the score with the at least one result and storing the score in the knowledge base.

Example 11

A computing system according to any of the previous examples, the operations further comprising:

receiving a second input stream from a second user computing device;

parsing the second input stream using natural language processing to generate a second parsed input stream;

translating the second parsed input stream into one or more of the plurality of parameters output from the machine learning model to generate a second search string;

searching a knowledge base using the second search string to determine a plurality of results associated with the parsed input stream, wherein each of the plurality of results is associated with a score;

selecting at least one result of the plurality of results based on the score associated with the at least one result; and providing the selected at least one result to the user computing device.

Example 12

A computing system according to any of the previous examples, the operations further comprising:

determining a score for the selected one result based on a user interaction via the user computing device with the computing system; and associating the score with the selected one result and storing the score in the knowledge base.

Example 13

A computing system according to any of the previous examples, wherein providing at least one result of the one or more results associated with the parsed input stream to the user computing device comprises selecting at least one result of the one or more results associated with the parsed input stream based on a ranking of the one or more results.

Example 14

A computing system according to any of the previous examples, wherein the one or more results are ranked based on a score associated with how useful the result is in responding to an input stream.

Example 15

A computing system according to any of the previous examples, wherein the computing system determines a score for the at least one result based on a user interaction via the user computing device in response to the at least one result provided to the user computing device, by detecting at least one of a group comprising: that there are no further inquiries input via the computing device after the at least one result is provided, based on further inquiries input after the at least one result is provided, by detecting an indication from the user computing device that the at least one result is satisfactory to a user associated with the user computing device, and determining that the result is a popular result.

Example 16

A computing system according to any of the previous examples, wherein the data related to the product and services support systems includes at least one of a group comprising: product documentation, services documentation, support ticket information, product reviews, services reviews, and frequently asked questions and answers.

Example 17

A non-transitory computer-readable medium comprising instructions stored thereon that are executable by at least one processor to cause a computing device to perform operations comprising:
  training a machine learning model using a plurality of data related to a product and services support system to determine a plurality of parameters to be used to search for one or more results for an input stream;
  determining the plurality of parameters output from the machine learning model to be used to search for one or more results for an input stream;
  storing the plurality of parameters output from the machine learning model in one or more databases;
  receiving an input stream from a user computing device;
  parsing the input stream using natural language processing to generate a parsed input stream;
  translating the parsed input stream into one or more of the plurality of parameters output from the machine learning model to generate a search string;
  searching a knowledge base using the search string, to determine one or more results associated with the parsed input stream; and
  providing at least one result of the one or more results associated with the parsed input stream to the user computing device.

Example 18

A non-transitory computer-readable medium according to any of the previous examples, the operations further comprising:
  determining, by the computing device, a score for the at least one result provided to the user computing device based on a user interaction via the user computing device in response to the at least one result provided to the user computing device; and
  associating the score with the at least one result and storing the score in the knowledge base.

Example 19

A non-transitory computer-readable medium according to any of the previous examples, wherein providing at least one result of the one or more results associated with the parsed input stream to the user computing device comprises selecting at least one result of the one or more results associated with the parsed input stream based on a ranking of the one or more results.

Example 20

A non-transitory computer-readable medium according to any of the previous examples, the operations further comprising:
  receiving a second input stream from a second user computing device;
  parsing the second input stream using natural language processing to generate a second parsed input stream;
  translating the second parsed input stream into one or more of the plurality of parameters output from the machine learning model to generate a second search string;
  searching a knowledge base using the second search string, to determine a plurality of results associated with the parsed input stream, wherein each of the plurality of results is associated with a score;
  selecting at least one result of the plurality of results based on the score associated with the at least one result; and
  providing the selected at least one result to the user computing device.

Figure 7:
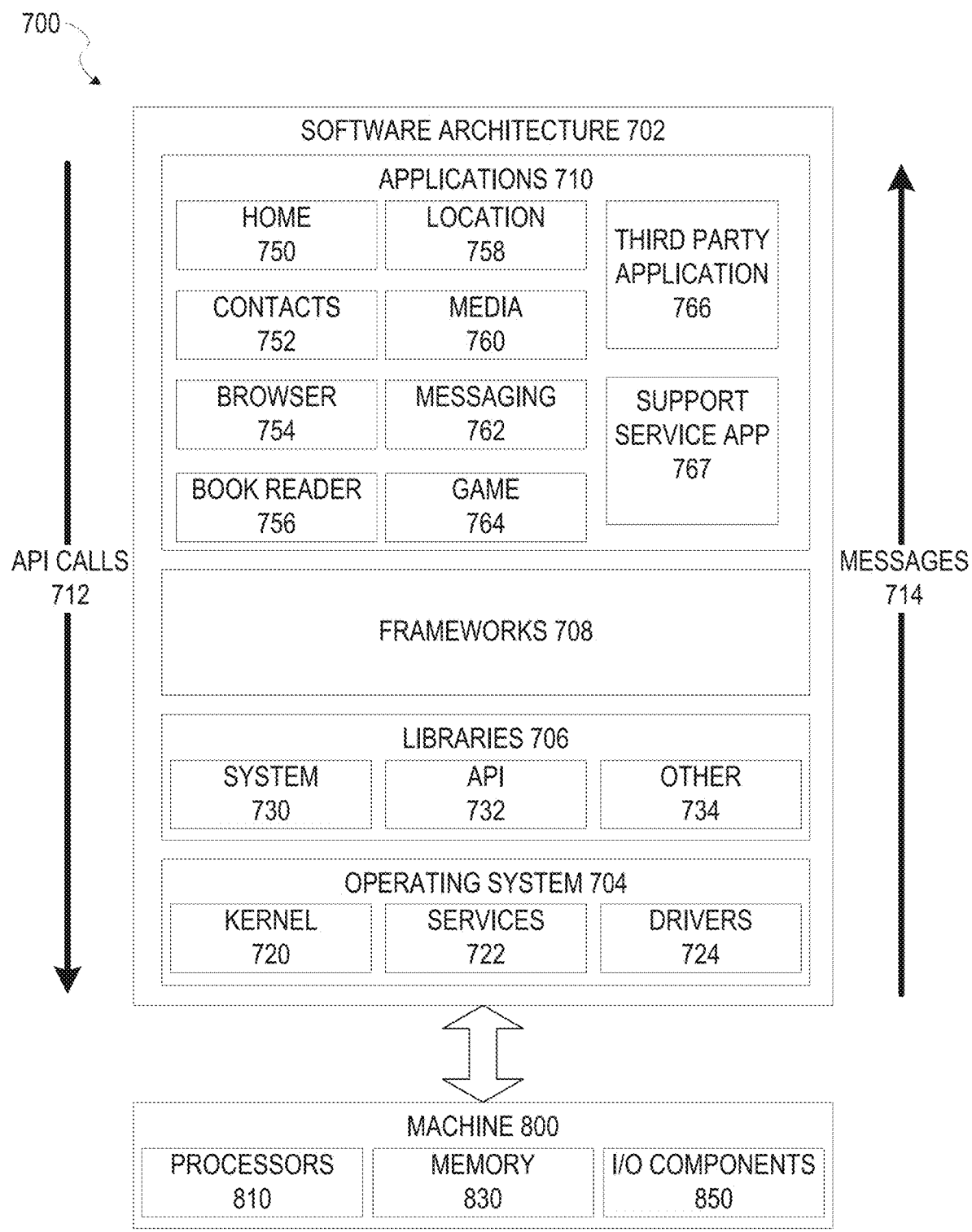
FIG. 7 is a block diagram illustrating an example of a software architecture that may be installed on a machine, according to some example embodiments.

FIG. 7 is a block diagram 700 illustrating software architecture 702, which can be installed on any one or more of the devices described above. For example, in various embodiments, client devices 110 and server systems 130, 102, 120, 122, and 124 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments.

For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a support service application 767, which may be any application that requests data or other tasks to be performed by systems and servers described herein, such as server system 102, third party servers 130, and so forth. In certain embodiments, this may be a stand-alone application that operates to manage communications with a server system such as third party servers 130 or server system 102. In other embodiments, this functionality may be integrated with another application. The support service application 767 may request and display various data related to products and services and may provide the capability for a user 106 to input data related to the system via voice, a touch interface, a keyboard, or using a camera device of machine 700, communication with a server system via I/O components 850, and receipt and storage of object data in memory 830. Presentation of information and user inputs associated with the information may be managed by task requesting application 767 using different frameworks 708, library 706 elements, or operating system 704 elements operating on a machine 700.

Figure 8:
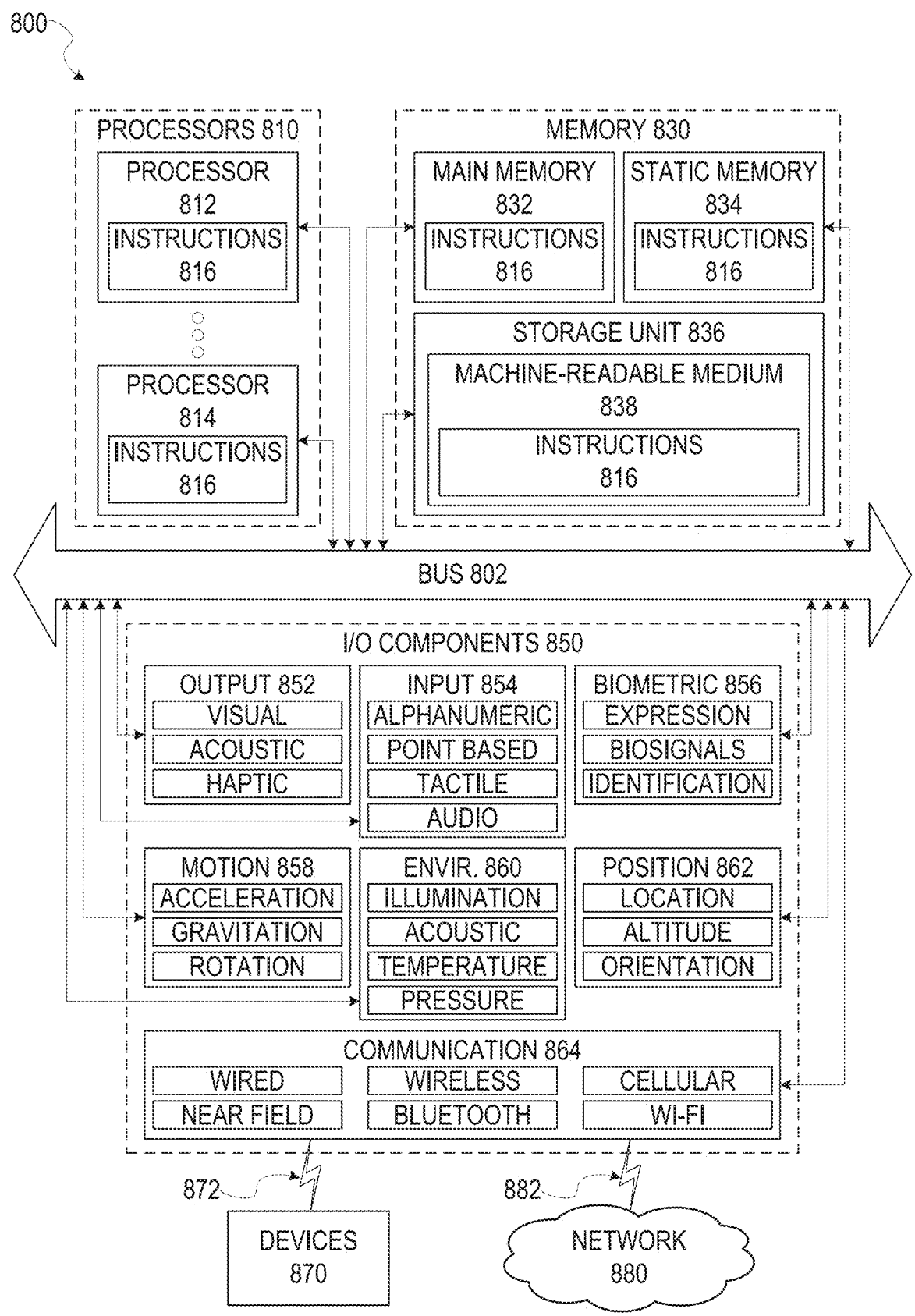
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, and the like, or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG.

8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement, the medium 838 should be considered as being transportable from one physical location to another. Additionally, since the machine-readable medium 838 is tangible, the medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    training, by a computing system, a machine learning model using a plurality of data related to a product and services support system to generate a set of search parameters to be used to search for one or more answers to respond to an input stream;
    generating, by the computing system, the set of search parameters using the machine learning model;
    storing, by the computing system, the set of search parameters output from the machine learning model in one or more databases;
    receiving, by the computing system, an input stream from a user computing device;
    parsing, by the computing system, the input stream using natural language processing to generate a parsed input stream comprising a set of terms of the input stream;

translating, by the computing system, the parsed input stream into a search stream by mapping each term of the set of terms of the input stream to each of a subset of the set of search parameters output from the machine learning model to generate the search string comprising the subset of search parameters output from the machine learning model;

searching, by the computing system, a knowledge base using the search string comprising the subset of search parameters output from the machine learning model, to determine a plurality of answers to respond to the input stream;

selecting, by the computing device, a highest ranked answer of the plurality of answers to respond to the input stream, based on a score associated with each of the plurality of answers;

providing, by the computing system to the user computing device, the highest ranked answer to respond to the input stream, causing the highest ranked answer to be displayed on a user interface of the user computing device; and wherein the computing system determines an updated score for highest ranked answer based on a user interaction via the user computing device in response to the highest ranked answer provided, by detecting at least one of a group comprising: that there are no further inquiries input via the computing device after the highest ranked answer is provided, based on further inquiries input after the highest ranked answer is provided, or based on a response received from the user computing device indicating that the highest ranked answer is satisfactory to a user associated with the user computing device.

2. The method of claim 1, further comprising:
associating the updated score with the highest ranked answer and storing the updated score in the knowledge base.

3. The method of claim 1, wherein before selecting the highest rank answer of the plurality of answers to respond to the input stream, based on the score associated with each answer of the plurality of answers, the method comprises:
ranking the plurality of answers based on the score associated with each answer.

4. The method of claim 3, wherein the plurality of answers are ranked based on a score associated with how useful the answer is for responding to an input stream.

5. The method of claim 1, wherein the data related to the product and services support systems includes at least one of a group comprising: product documentation, services documentation, support ticket information, product reviews, services reviews, and frequently asked questions and answers.

6. A computing system comprising:
at least one processor; and
a non-transitory computer-readable medium coupled with the at least one processor, the computer-readable medium comprising instructions stored thereon that are executable by the at least one processor to cause the computing system to perform operations comprising:
training a machine learning model using a plurality of data related to a product and services support system to generate a set of search parameters to be used to search for one or more answers to respond to an input stream;
generating the set of search parameters using the machine learning model;
storing the set of search parameters output from the machine learning model in one or more databases;
receiving an input stream from a user computing device;
parsing the input stream using natural language processing to generate a parsed input stream comprising a set of terms of the input stream;
translating the parsed input stream into a search stream by mapping each term of the set of terms of the input stream to each of a subset of the set of search parameters output from the machine learning model to generate the search string comprising the subset of search parameters output from the machine learning model;
searching a knowledge base using the search string comprising the subset of search parameters output from the machine learning model, to determine a plurality of answers to respond to the input stream;
selecting a highest ranked answer of the plurality of answers to respond to the input stream, based on a score associated with each of the plurality of answers;
providing to the user computing device, the highest ranked answer to respond to the input stream, causing the highest ranked answer to be displayed on a user interface of the user computing device; and
wherein the computing system determines an updated score for highest ranked answer based on a user interaction via the user computing device in response to the highest ranked answer provided, by detecting at least one of a group comprising: that there are no further inquiries input via the computing device after the highest ranked answer is provided, based on further inquiries input after the highest ranked answer is provided, or based on a response received from the user computing device indicating that the highest ranked answer is satisfactory to a user associated with the user computing device.

7. The computing system of claim 6, the operations further comprising:
associating the updated score with the highest ranked answer and storing the updated score in the knowledge base.

8. The computing system of claim 6, wherein before selecting the highest rank answer of the plurality of answers to respond to the input stream, based on the score associated with each answer of the plurality of answers, the operations comprise:
ranking the plurality of answers based on the score associated with each answer.

9. The computing system of claim 8, wherein the plurality of answers are ranked based on a score associated with how useful the answer is for responding to an input stream.

10. The computing system of claim 6, wherein the data related to the product and services support systems includes at least one of a group comprising: product documentation, services documentation, support ticket information, product reviews, services reviews, and frequently asked questions and answers.

11. A non-transitory computer-readable medium comprising instructions stored thereon that are executable by at least one processor to cause a computing device to perform operations comprising:
training a machine learning model using a plurality of data related to a product and services support system to generate a set of search parameters to be used to search for one or more answers to respond to an input stream;
generating the set of search parameters using the machine learning model;
storing the set of search parameters output from the machine learning model in one or more databases;
receiving an input stream from a user computing device;

parsing the input stream using natural language processing to generate a parsed input stream comprising a set of terms of the input stream;
translating the parsed input stream into a search stream by mapping each term of the set of terms of the input stream to each of a subset of the set of search parameters output from the machine learning model to generate the search string comprising the subset of search parameters output from the machine learning model;
searching a knowledge base using the search string comprising the subset of search parameters output from the machine learning model, to determine a plurality of answers to respond to the input stream;
selecting a highest ranked answer of the plurality of answers to respond to the input stream, based on a score associated with each of the plurality of answers;
providing to the user computing device, the highest ranked answer to respond to the input stream, causing the highest ranked answer to be displayed on a user interface of the user computing device; and
wherein the computing system determines an updated score for highest ranked answer based on a user interaction via the user computing device in response to the highest ranked answer provided, by detecting at least one of a group comprising: that there are no further inquiries input via the computing device after the highest ranked answer is provided, based on further inquiries input after the highest ranked answer is provided, or based on a response received from the user computing device indicating that the highest ranked answer is satisfactory to a user associated with the user computing device.

12. The non-transitory computer-readable medium of claim 11, the operations further comprising:
associating the updated score with the highest ranked answer and storing the updated score in the knowledge base.

13. The non-transitory computer-readable medium of claim 11, wherein before selecting the highest rank answer of the plurality of answers to respond to the input stream, based on the score associated with each answer of the plurality of answers, the operations comprise:
ranking the plurality of answers based on the score associated with each answer.

14. The method of claim 2, further comprising:
re-indexing a search index based on the updated score of the highest ranked answer.

15. The computing system of claim 7, the operations further comprising:
re-indexing a search index based on the updated score of the highest ranked answer.

16. The non-transitory computer-readable medium of claim 7, the operations further comprising:
re-indexing a search index based on the updated score of the highest ranked answer.

17. The non-transitory computer-readable medium of claim 13, wherein the plurality of answers is ranked based on a score associated with how useful the answer is for responding to an input stream.

* * * * *